(12) United States Patent
Jacobson et al.

(10) Patent No.: US 10,877,253 B2
(45) Date of Patent: Dec. 29, 2020

(54) OPTICAL SYSTEM

(71) Applicant: PELKA & ASSOCIATES INC., Los Angeles, CA (US)

(72) Inventors: Benjamin A. Jacobson, Chicago, IL (US); Robert D. Gengelbach, Rochester, NY (US)

(73) Assignee: PELKA & ASSOCIATES INC., Los Angeles, CA (US)

( * ) Notice: Subject to any disclaimer, the term of this patent is extended or adjusted under 35 U.S.C. 154(b) by 236 days.

(21) Appl. No.: 15/809,800

(22) Filed: Nov. 10, 2017

(65) Prior Publication Data

US 2018/0149845 A1    May 31, 2018

Related U.S. Application Data

(60) Provisional application No. 62/420,855, filed on Nov. 11, 2016.

(51) Int. Cl.
*G02B 17/00* (2006.01)
*G02B 17/08* (2006.01)
*G02B 19/00* (2006.01)

(52) U.S. Cl.
CPC ..... *G02B 17/0868* (2013.01); *G02B 19/0028* (2013.01); *G02B 19/0061* (2013.01)

(58) Field of Classification Search
CPC .................................................. G02B 17/0868
USPC .......................................................... 359/727
See application file for complete search history.

(56) References Cited

U.S. PATENT DOCUMENTS

| | | | |
|---|---|---|---|
| 4,114,592 A | 9/1978 | Winston | |
| 4,240,692 A | 12/1980 | Winston | |
| 5,243,459 A | 9/1993 | Winston et al. | |
| 5,285,318 A | 2/1994 | Gleckman | |
| 5,610,768 A * | 3/1997 | Winston | G02B 19/0042 359/727 |
| 7,068,446 B2 | 6/2006 | Jacobson et al. | |

OTHER PUBLICATIONS

Friedman, R.P., et al., "Optical designs for ultrahigh-flux infrared and solar energy collection: monolithic dielectric tailored edge-ray concentrators", Applied Optics, Dec. 1, 1996, 35(34):6684-6691.

* cited by examiner

*Primary Examiner* — James C. Jones
(74) *Attorney, Agent, or Firm* — Foley & Lardner LLP

(57) ABSTRACT

An optical system for light distribution. The optical system includes at least a reflective surface, at least two refracting surfaces, at least one inner lens and an outer lens. The optical system provides high efficiency collection and distribution of light.

15 Claims, 16 Drawing Sheets

OPTICAL SYSTEM

CROSS-REFERENCE TO RELATED APPLICATION

This application claims benefit of U.S. Provisional Patent Application No. 62/420,855 filed Nov. 11, 2016, the entire content of which is incorporated herein by reference.

BACKGROUND

High efficiency light collection is important in a number of applications, including lighting and illumination, displays, document scanning and machine vision, signaling, aviation and automotive lighting, medical instrumentation, infrared and optical wireless communications, and signal detection. Typically a light collection optical system is needed to convert a first spatial and angular distribution to a second, different spatial and angular distribution. Very commonly the collector couples light from a small, wide-angle source to a larger more collimated beam. It is generally desirable that such light collectors couple the highest possible fraction of light into the desired aperture and angles, with minimum size and cost.

Various light collectors are known in the art. Spherical lenses, aspheric lenses, and combinations of parabolic, elliptical, and hyperbolic mirrors have been used for centuries. Most of these systems are "imaging," meaning that the surfaces are designed to redirect light from a central point or angle in the first distribution to a central point or angle in the second distribution. Light from points or angles near enough to the center point or angle in the first distribution is, by similarity, redirected into the neighborhood of the center point or angle in the second distribution, with the same number of reflections or refractions for almost all the rays of interest. Unlike the central rays, the non-central points and angles are only approximately redirected into each other. Therefore control over the edges of the distributions is typically limited, and one of the light distributions often spreads over larger areas or angles than is desired, with non-uniform beam output and gradual rather than sharp angular cut-off. Control is particularly limited when one of the distributions has very large angles, or when the spatial extent of the smaller distribution is not much smaller than a characteristic length scale of the collector.

More recently introduced are "edge-ray" collectors which are designed to redirect the rays at the spatial or angular boundary of the first distribution to a spatial or angular boundary of the second distribution. It can be shown that, when distribution boundaries are so coupled, the rays in the interior of one distribution will then be coupled into the interior of the other distribution. However, different portions of the interior typically have a different number of reflections or refractions from each other or from the edge. In undergoing these different numbers of reflections or refractions, adjacent portions of the first distribution may end up non-adjacent in the second distribution, and therefore these collectors are "non-imaging." These non-imaging collectors provide much more precise control over the spread of the light distributions, typically maintaining both distributions within their theoretical limits even for large-area or large-angle beams that are poorly handled by imaging collectors. This more precise control is often desirable for the applications described above. Typically for these collectors opposite surfaces are designed to redirect opposite edges of the distribution.

Simple imaging collectors are typically very compact: for example, a parabolic mirror with ±90° light collection has a length-to-diameter ratio ("aspect ratio") of 0.25. By comparison, many non-imaging designs are undesirably U.S. Pat. No. 4,240,692 describes a non-imaging concentrator known as a Compound Parabolic Concentrator (CPC). The CPC is a hollow, funnel-shaped, mirror that redirects rays from a spatial edge at its small end into the angular edge of a beam at its large end. For narrow-angle beams, the CPC is undesirably long: for example, the aspect ratio of a ±10° CPC is over 3. The CPC can be truncated to reduce the length, but then efficiency is reduced or the spread of the light distribution is increased.

This aspect ratio has been reduced by a class of collectors using one refractive surface with a funnel-shaped reflective light-pipe. For example, U.S. Pat. No. 4,114,592 shows an alternate edge-ray collector known as a Dielectric Total Internal Reflection Concentrator (DTIRC) that uses a spherical refracting front surface. This improvement reduces the aspect ratio of a ±10° collector to approximately 1.7. U.S. Pat. No. 5,285,318 improves on the DTIRC by using an aspheric instead of a spherical refracting surface, reducing the ±10° aspect ratio to about 1.3. Friedman and Gordon published a further improvement in "Optical designs for ultrahigh-flux infrared and solar energy collection: monolithic dielectric tailored edge-ray concentrators," Applied Optics, Vol. 35, No. 34, 1 Dec. 1996, pp. 6684-91. They showed that with a different aspheric refracting surface the ±10° aspect ratio could be reduced to about 1.2, and that this was the theoretical limit with a single refraction at the front surface. Moreover, these designs require very thick dielectric components, which are difficult to mold accurately at low cost.

Minano and co-workers have published several designs that combine one refractive surface and one or more reflective surfaces. These designs reduce the aspect ratio to approximately 0.25; but in all these designs the small aperture is placed in front of a large back-reflecting mirror, so that the small aperture obstructs the large aperture. When the apertures are very different in size, as for narrow-angle collimators, the area ratio is low; and the obstruction can be small, but for larger angles the obstruction is unacceptable. Moreover, these collectors are often undesirable when a source or detector at the small aperture needs to be supported by a substrate including a circuit board or heat sink, as is common with high power LED light sources, for example. Minano and co-workers have also published designs with two refracting surfaces and no reflecting surfaces, but the largest collection angle at the small aperture is limited.

The current invention uses an aspheric dielectric lens with two refracting surfaces at the large aperture of a hollow, funnel-shaped reflector. The back surface of the dielectric (the surface facing the reflector) has higher curvature than the front surface, making the structure more compact. This approach achieves performance comparable to a non-truncated CPC, with much better compactness. Aspect ratios range from 0.4-0.75. Moreover, the dielectric lens has acceptably low thickness for cost-effective molding. Unlike the Minano designs, the small aperture of the funnel is advantageously positioned behind the optic, so that a source or detector can be supported by a much larger circuit board or heat sink without shadowing. Winston and co-workers have published designs with a spherical lens and funnel-shaped reflector, including U.S. Pat. No. 5,243,459, but these designs are not nearly as compact as the current invention.

U.S. Pat. No. 7,068,446 describes a nonimaging optical system for processing a first and second light distribution that addresses some of these issues. The nonimaging optical system includes at least two refractive surfaces, at least one reflective surface nearer to the first light distribution along at least one ray path than the nearer of the two refracting surfaces and the reflective surface and the refractive surfaces cooperating to redirect light edge rays of the first light distribution into the neighborhood of the edge of the second light distribution with a single reflection from the reflecting surface. However, the solutions proposed in the '446 patent exhibit several failings. For example, the optics described therein have sharp edges and color non-uniformities. In addition, certain new embodiments have been found which achieve asymmetric second light distributions using surfaces that are not rotationally symmetrical about the optical axis (commonly defined as the central axis of the of the first or second light distributions.

Further improvements in optics are needed, particularly for specific usage scenarios where the above described optical systems are nonoptimal.

SUMMARY

Embodiments described herein relate generally to optical systems. In particular, some embodiments include at least two reflective surfaces, at least two refracting surfaces, at least one inner lens and an outer lens.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
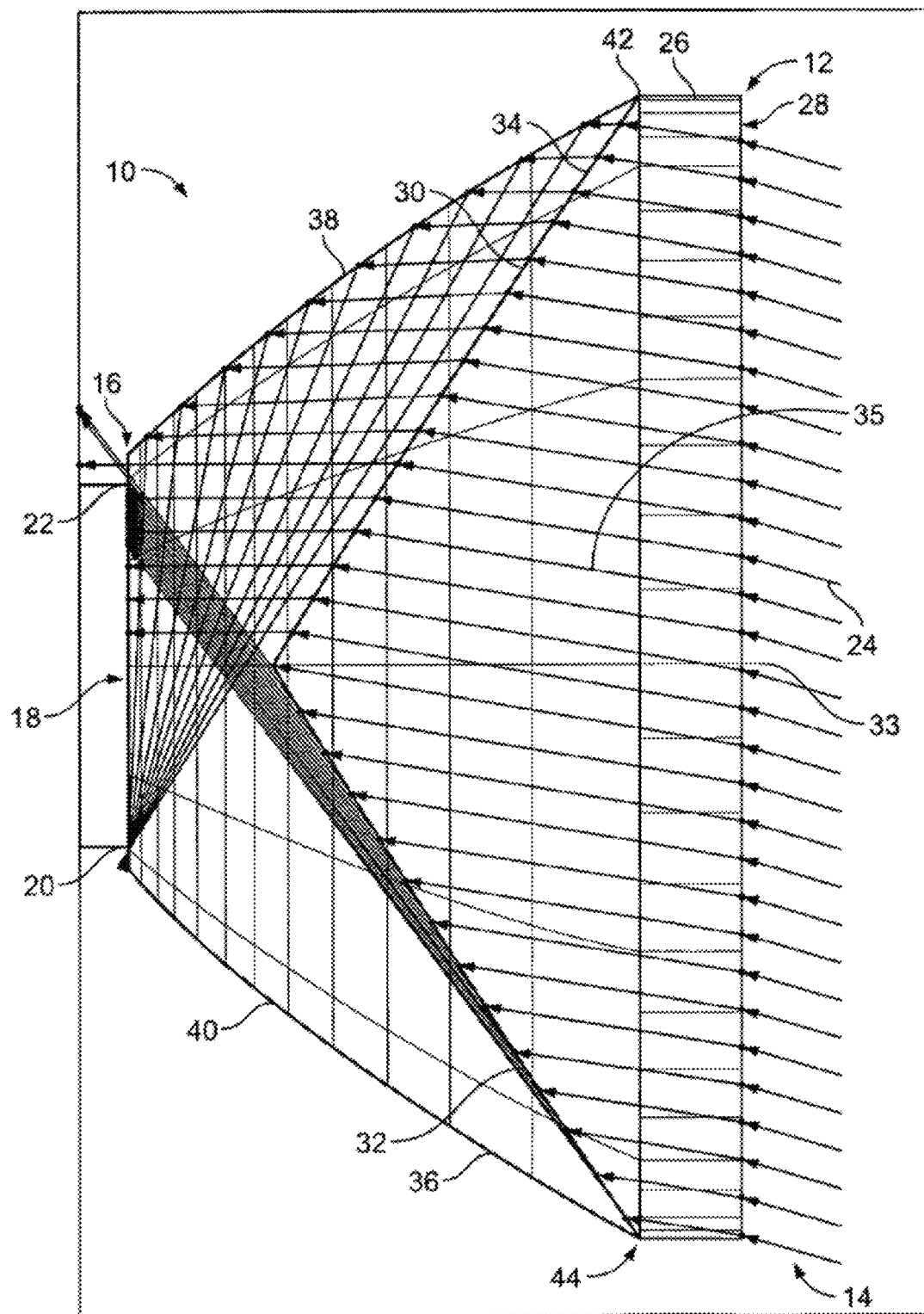
FIG. 1 shows a small aperture on the left 16 coinciding with a back-surface distribution 18 having a bottom edge 20 and a top edge 22 of U.S. Pat. No. 7,068,446.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

One embodiment of an optical system known in the art is described in U.S. Pat. No. 7,068,446, incorporated herein by reference, and shown generally at 10 in FIG. 1. The figure shows a cross-section with a large aperture 12 on the right coinciding with a front-surface distribution 14 having an angular range ± θ, where the rays at +θ and −θ are angular edge-rays. FIG. 1 also shows a small aperture on the left 16 coinciding with a back-surface distribution 18 having a bottom edge 20 and a top edge 22. The spatial extent of the back-surface distribution 18 can be smaller than or equal to the extent of the small aperture 16. The optical system 10 may be a surface of revolution of the cross-section shown, so that the input and output apertures 16 and 12 are circular. Alternatively, it can be a trough-shaped element continuing this cross-section perpendicular to the plane of the page. In yet another alternative embodiment, the optical system 10 has four or six similar sides connecting to form square or hexagonal input and output apertures.

The optical system 10 cross-section shown is designed to transform a large ± 15° beam 14 into a smaller ± 90° beam 18. The rays 24 shown are edge rays, entering the lens 26 at −15°, the boundary of the desired front surface distribution 14. The front surface 28 of the lens 26 is flat. The back surface 30 of the lens 26 is sloped and curved. In FIG. 1, the cross-section shows the back surface 30 having a bottom arm 32 and a top arm 34 on opposite sides of the centerline 33. The back side bottom arm 32 is shaped and angled to redirect the edge rays 24 striking that one side approximately to the top edge 22 of the back-surface distribution. It will be appreciated that opposite edge-rays at +15° (not shown) striking the back surface top arm 34, by symmetry, would be redirected approximately to the bottom edge 20 of the back-surface distribution. Therefore, necessarily, the −15° edge-rays 24 striking the back surface top arm 34 cannot also be redirected to the back-surface distribution edge 20 by refraction alone. The reflector surface 36 fills this function. The reflector top arm 38, as shown, is shaped to redirect the −15° edge-rays 24 that strike it to the bottom edge 20 of the back-surface distribution. By symmetry, the +15° edge-rays (not shown) that strike the bottom arm of the reflector 40 would be redirected to the top edge 22 of the back-surface distribution. Thus the lens 26 and reflector 36 act cooperatively to redirect substantially all the angular edge-rays 24 into the neighborhood of the edges 20 and 22 of the back-surface distribution 18. The collector 10 is etendue-preserving: i.e., the first and second beam distributions 14 and 18 approximately satisfy the equation $$n_1 D_1 \sin \theta_1 = n_2 D_2 \sin \theta_2 \tag{1}$$

In FIG. 1, for example, $\theta_1$ is the front surface angle=θ=15° and $\theta_2$ is the maximum back-surface angle=90°.

The refractive surfaces can have a variety of shapes. In FIG. 1, the lens front surface 28 is flat and the back surface 30 is a single hyperbola. In another embodiment, the back surface is a compound hyperbola: the bottom and top arms 32 and 34 are opposing, oppositely tilted off-axis hyperbolas. When the front surface 28 is flat, as in FIG. 1, the off-axis hyperbola 32 has an axis parallel to the segments 35 of the edge-rays 24 interior to the lens 26, so that the bottom arm 32 redirects the ray segments 35 to focus substantially near the edge 22 of the back surface distribution.

The hyperbola 32 has eccentricity=n=the index of the lens material (1.49 for PMMA plastic in FIG. 1). The focus of the hyperbola is the edge 22 of the back-surface distribution.

The parameter l is chosen such that the curve intersects the desired outer edge position 42 of the lens aperture 44, giving the lens 26 the desired aperture diameter and placing it at the desired distance from the back-surface distribution 18. In FIG. 1, the back surface 30 is a single conic with parameters chosen to best-fit the off-axis hyperbolas. As will be apparent to one skilled in the art, the surface shapes 28 and 30 can be varied slightly as long as the overall slope changes are sufficiently small that the surface 32 continues to redirect the angular edge-rays 24 approximately to the edge 22 of the back-surface distribution as shown.

The reflector 36 in FIG. 1 can likewise have a variety of shapes, so long as it redirects the angular edge-rays 24 approximately to the bottom edge 20 of the back-surface distribution as shown. The shape may be calculated once the lens shape is determined. This shape could be designed to focus the edge-rays exactly, by solving numerically for the slope and position at each point (i.e., by solving the appropriate differential equation), or by solving an equal-optical-path-length equation. Alternatively, the reflector 36 can focus the edge-rays 24 only approximately at the bottom edge 20 of the back-surface distribution, either by solving a slightly different differential equation or path length equation, or by iteratively optimizing a polynomial or conic section. The reflector 36 in FIG. 1 is an off-axis conic section.

Figure 2:
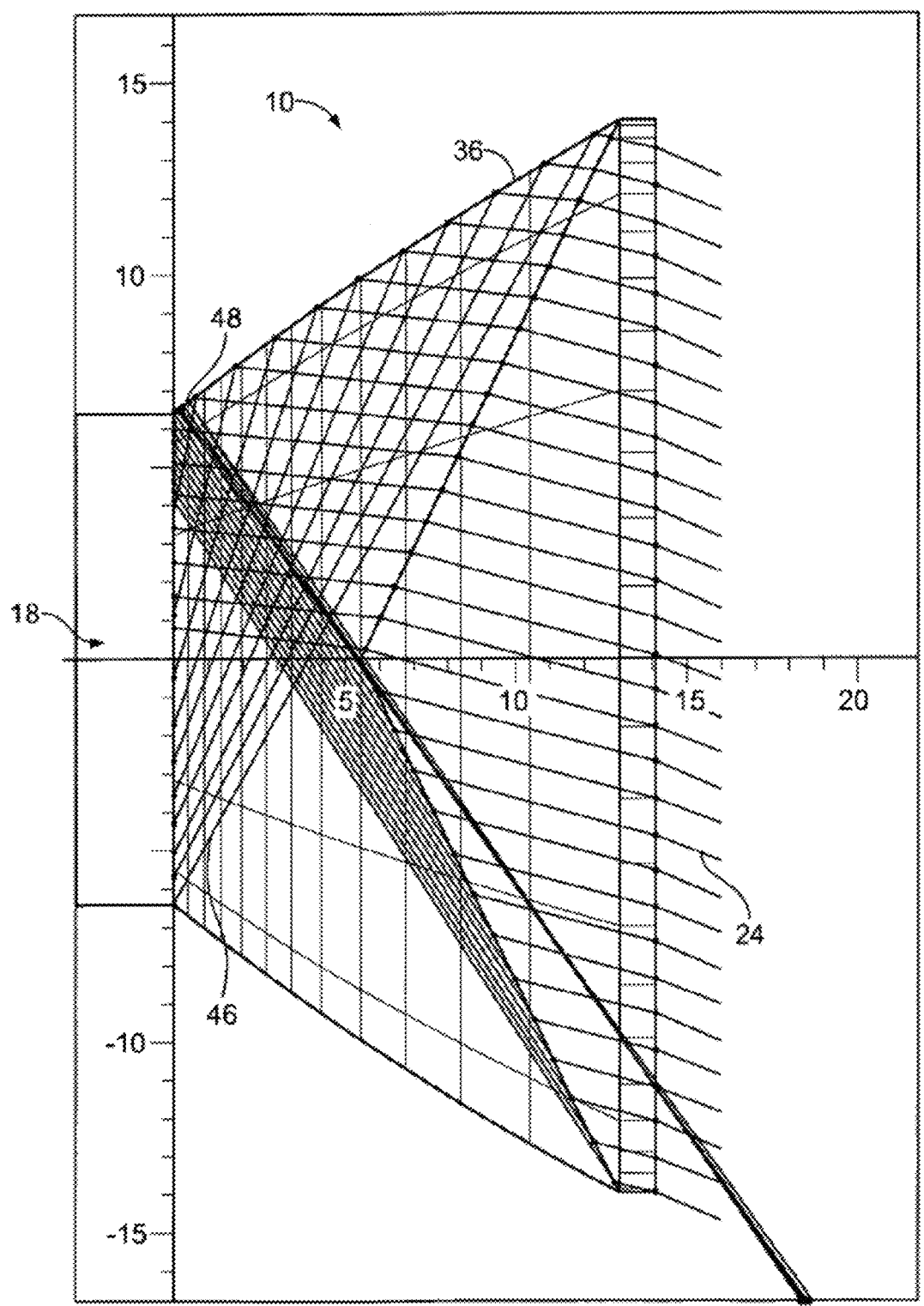
FIG. 2 shows another embodiment of the optical system of U.S. Pat. No. 7,068,446.

FIG. 2 shows another embodiment of the optical system 10, in which the front-surface angular edge-rays 24 at $-\theta_1$ are redirected to the extreme angles of the back-surface distribution 18 $+\theta_2$ (shown at 46) and $-\theta_2$ (shown at 48), rather than to a spatial edge of the back-surface distribution 18 as in FIG. 1. In this case $\theta_1$ and $\theta_2$, along with the associated spatial diameters, approximately satisfy equation (1). The reflector 36 can also be a compound reflector, in which a front portion of the reflector 36 focuses the edge-rays 24 to the bottom 20 of the back-surface distribution as in FIG. 1, and a back portion focuses the edge-rays 24 to a maximum angle 46 as in FIG. 2.

Figure 3:
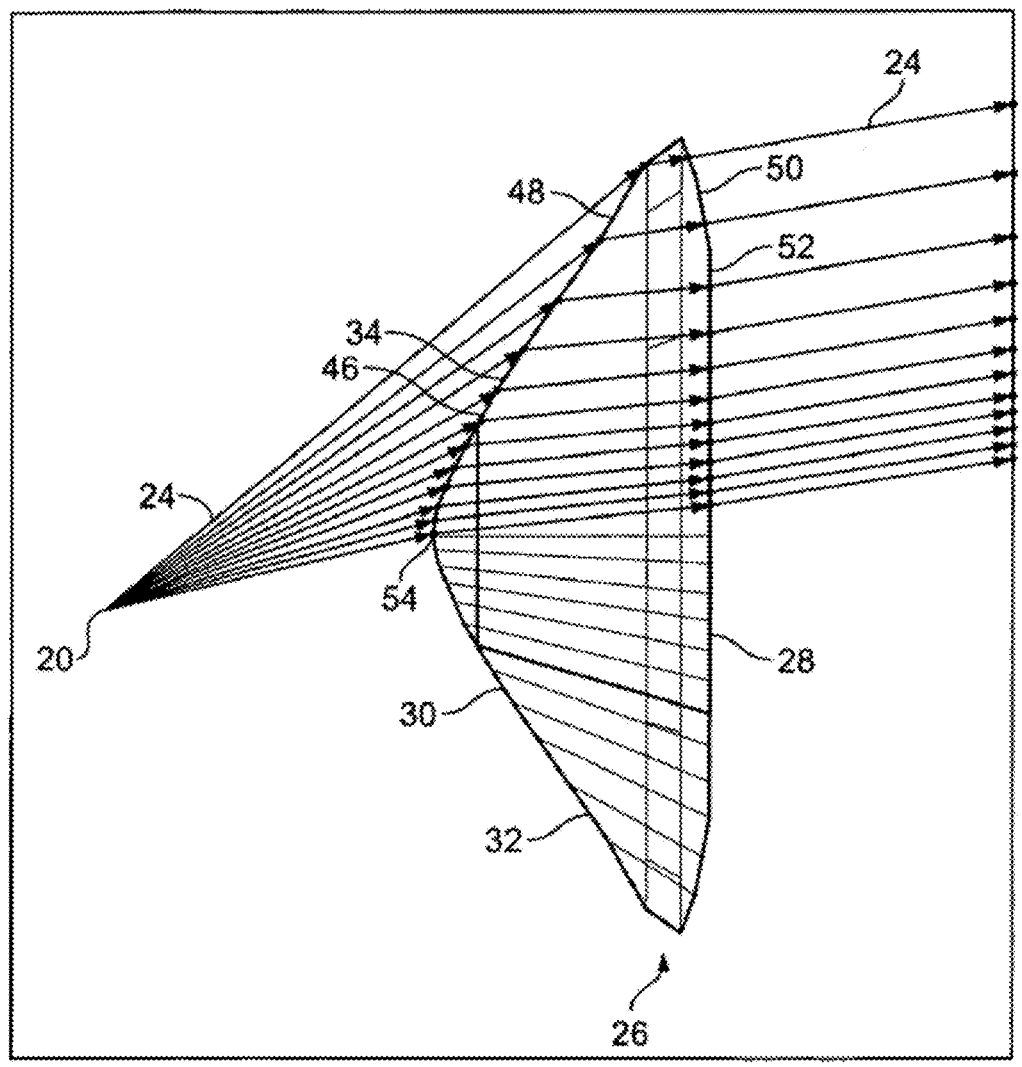
FIG. 3 shows another embodiment (reflector not shown) of the optical system of U.S. Pat. No. 7,068,446.

FIG. 3 shows another embodiment (for simplicity the reflector is not shown). In this embodiment each back surface arm 32 and 34 is a combination of off-axis hyperbola and logarithmic spiral. The inner portion 46 of each arm (closest to the centerline) is a hyperbola as described above. The outer portion 48 is a logarithmic spiral, with the equation in the same coordinate system described above:

$$r(\phi) = r_0 e^{(\phi - \phi_0) \tan \theta_{i\,max}} \tag{2}$$

Since the logarithmic spiral is the outer section, the parameters $r_0$ and $\phi_0$ are chosen to provide the desired diameter and position. The parameter $\theta_{imax}$ is the angle of incidence made by the edge-rays 24 with the lens surface 48 in the medium (usually air) between the lens 26 and the reflector. The designer may limit this angle to minimize Fresnel reflections. The inner section 46 of each arm is an off-axis hyperbola as described above, but now the parameter l is chosen to provide a continuous surface with the outer logarithmic spiral section 48.

In the embodiment of FIG. 3 the front surface 28 of the lens 26 is likewise two sections. The outer portion 50 is designed to cooperate with the log spiral portion 48 of the back surface to refract the angular edge-rays 24 to the edge 20 of the back-surface distribution as described previously. This portion 50 could be designed by solving numerically for the slope and position at each point, by solving an equal-optical-path-length equation, or by iteratively optimizing a polynomial or conic section. The inner portion 52 of the front surface is flat. The edge rays 24 striking this flat inner portion 52 are redirected to the inner, off-axis hyperbola portion 46 of the back surface.

In FIG. 3, $\theta_{imax}=70°$ and is held constant; but $\theta_{imax}$ could also be varied across the surface without changing the essential focusing of the angular edge-rays 24 onto the back-surface distribution edge 20. The compound back surface 34 can also include a flat central section, to simplify the optics by avoiding having a cusp at the center 54, and increase manufacturability.

The refractive component 26 can be made of a variety of materials. In FIG. 1 the lens material has index 1.49, as for PMMA (also known as acrylic) that is commonly used for molded optical parts. Other materials such as glass and polycarbonate can also be used, as long as the material is substantially transparent to the wavelengths of interest. Higher-index materials increase the overall compactness, and can also affect the cost, reliability, manufacturability, or mechanical properties of the device. The lens 26 shown in FIG. 3 uses polycarbonate with index approximately 1.59. The small-aperture-to-lens distance is accordingly smaller than would be obtained with PMMA. The material can be formed to the desired shape by one or more processes of molding, machining, or casting.

The reflector 36 can be any solid material including plastic, glass, ceramic, or metal, provided that inner surface is given an approximately specular finish and has a high reflectivity for the wavelengths of interest. The material can be formed to the desired shape by one or more processes of molding, machining, or casting. For materials that lack intrinsically high reflectivity, the surface 36 can be coated with high-reflectivity materials, for example aluminum. The inner surface can also have a transparent protective coating to increase the robustness and lifetime of the reflectivity.

Compactness is a critical advantage of the current optical system 10, and there are a number of design modifications that can be introduced to reduce the size. The focus of the edge-rays 24 onto the back-surface distribution edge 20 or 22 can be approximate, as shown in FIG. 1, rather than exact as in FIG. 3. Likewise, the angles of the angular edge-rays 24 at the large aperture could be varied to reduce the required curvature, particularly at the outer portion where the largest refraction is required.

Figure 4:
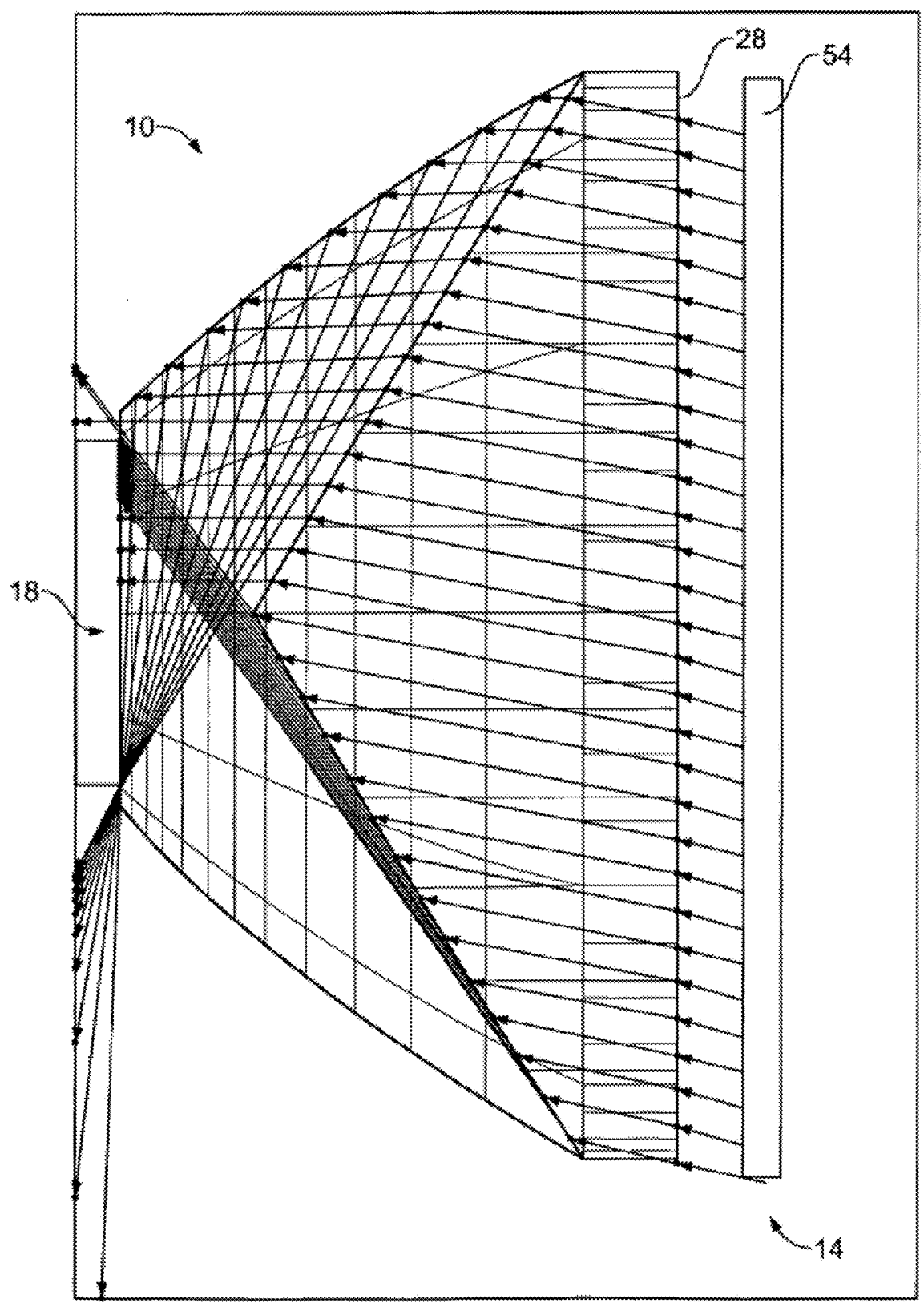
FIG. 4 shows another embodiment of the optical system of U.S. Pat. No. 7,068,446.
Figure 5:
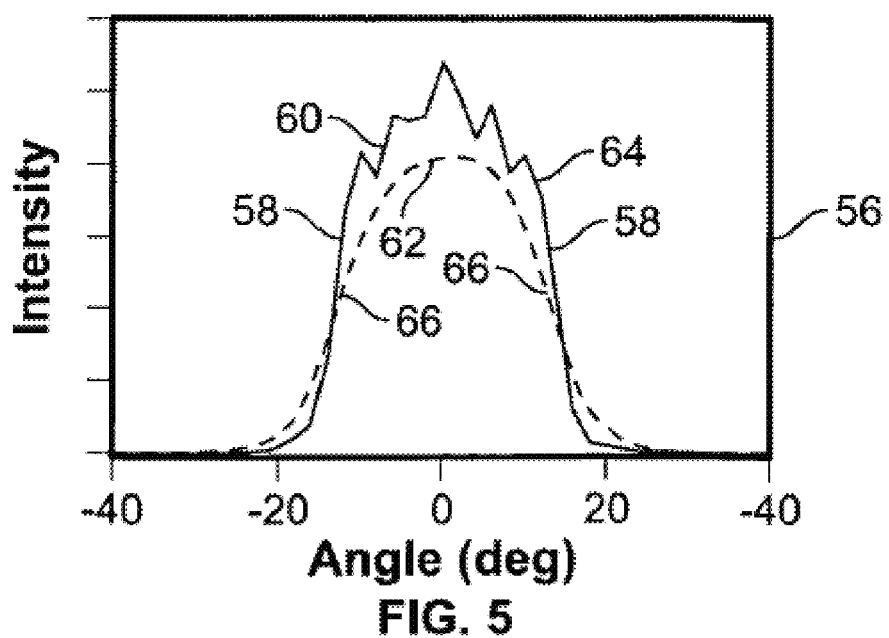
FIG. 5 shows an example of a light output distribution measured with and without a diffuser.

FIG. 4 shows a further embodiment of the optical system 10, in which the front refractive surface is overlaid with a diffuser layer 54. The diffuser layer 54 redirects a ray from a single angle θ into a spread of angles θ±Δθ. The diffuser improves the uniformity of the light output distribution. FIG. 5 shows an example 56 of a light output distribution measured with (62) and without (64) a diffuser 54. In the device used to make this measurement, the back-surface distribution 18 is the light output of an LED array placed at the small aperture. The measurement shows the front-surface output 14 vs. far-field angle. Without the diffuser 54, the output light has exceptionally sharp cut-offs 58, but also has noticeable non-uniformities 60. In the measurement of FIG. 5 the non-uniformities 60 are especially pronounced because the LED array source is non-uniform. The diffuser 54 removes the non-uniformities 60 and also softens the angular cut-off 66. In most cases a more uniform beam is advantageous. In general it is desirable to maximize uniformity while maintaining sharp as possible angular cut-off, but in some cases a softer cut-off is advantageous as well. Different diffusers will provide different uniformity vs. cut-off trade-offs. In general a diffuser with larger Δθ will improve the uniformity more, but will also soften the cut-offs more.

The exact nature of the diffuser will determine the trade-off, and also other characteristics of the output as well. Other desirable features of a diffuser are high transmission efficiency, and a low degree of scattering into large angles beyond the desired Δθ. FIG. 5 was measured with a high-quality holographic diffuser. Such diffusers provide high (90% or greater) transmission efficiency, low scattering, and provide an excellent maximum uniformity enhancement for a given angular cut-off. Other types of diffusers known in the art include random rough-surface diffusers, microlens diffusers, and lenticular diffusers. All of these diffusers can be cost-effectively manufactured by embossing or casting a polymer film or sheet with an appropriate surface pattern. For example, holographic diffusers can be made by creating a holographic surface pattern in a metal tool and using the tool to emboss or cast a polymer film.

In a further embodiment the diffuser 54 can be an "elliptical diffuser" that redirects light into an asymmetrical distribution. For example, a ray at θ can be redirected into ±Δθ$_H$ in the horizontal direction and ±Δθ$_V$ in the vertical direction. The resulting light output distribution can then be larger in one axis than in the other. For example, a wider horizontal distribution is often desirable for lighting a display arranged on a horizontal surface.

An advantage of using a separate polymer film 54, as in FIG. 4, is that multiple beam patterns can be obtained without changing the shape of the optic. For example, multiple patterns can be obtained from a single set of optic molds, enabling the supplier to offer multiple options without incurring the tooling cost associated with multiple mold sets. Another advantage is that the user can buy a single light source with optic and multiple diffusers, and then change the beam pattern in place by substituting different diffusers.

However, adding a separate diffuser layer 54 to the assembly also increase per-unit cost and potentially reduces reliability. In a further embodiment, uniformity enhancing features can be added to the reflective or refractive surfaces 36, 28, and 20 of the optical system 10. These features can include facets, roughness, or a holographic diffuser pattern. In a preferred embodiment, a holographic diffuser pattern is added to the mold surface that forms the front refractive surface 28.

A highly preferred feature of the invention is the presence of an aspheric back refractive surface together with a front refractive surface and at least one funnel-shaped reflective surface, all three surfaces acting cooperatively to redirect edge-rays from a first distribution into edge-rays of a second distribution. An advantageous feature is that the two distributions approximately satisfy the etendue-preservation equation in equation (1). An additional advantageous feature is the higher curvature of the back refractive surface, causing the lens to protrude substantially back into the funnel-shaped reflector to maximize the compactness of the device. Another advantageous feature is the addition of at least one uniformity-enhancing feature, such as a holographic diffuser surface.

Non-Circularly Symmetric Implementations

Thus, while U.S. Pat. No. 7,068,446 describes an improved optical system, there remain additional problems with those described optical systems. FIGS. 1-4 herein, as presented in the '446 patent and FIGS. 6, 7, and 10-13, illustrating some embodiments of optical systems improving over those of the '446 patent, show 2D cross-sections including at least one reflecting and at least two refracting surfaces. Let the x-axis be the optical axis. When these 2D cross-sections are rotated around the optical axis, a generally conical reflector and a lens with an approximately circular boundary are formed. Alternately, the cross-sections of one or more of the surfaces can be rotated around the y or z axis.

It can be particularly advantageous, for example to rotate the reflector and inner refractive surface around the z-axis (vertical axis), while having a different shape for the outer refractive surface.

Figure 6:
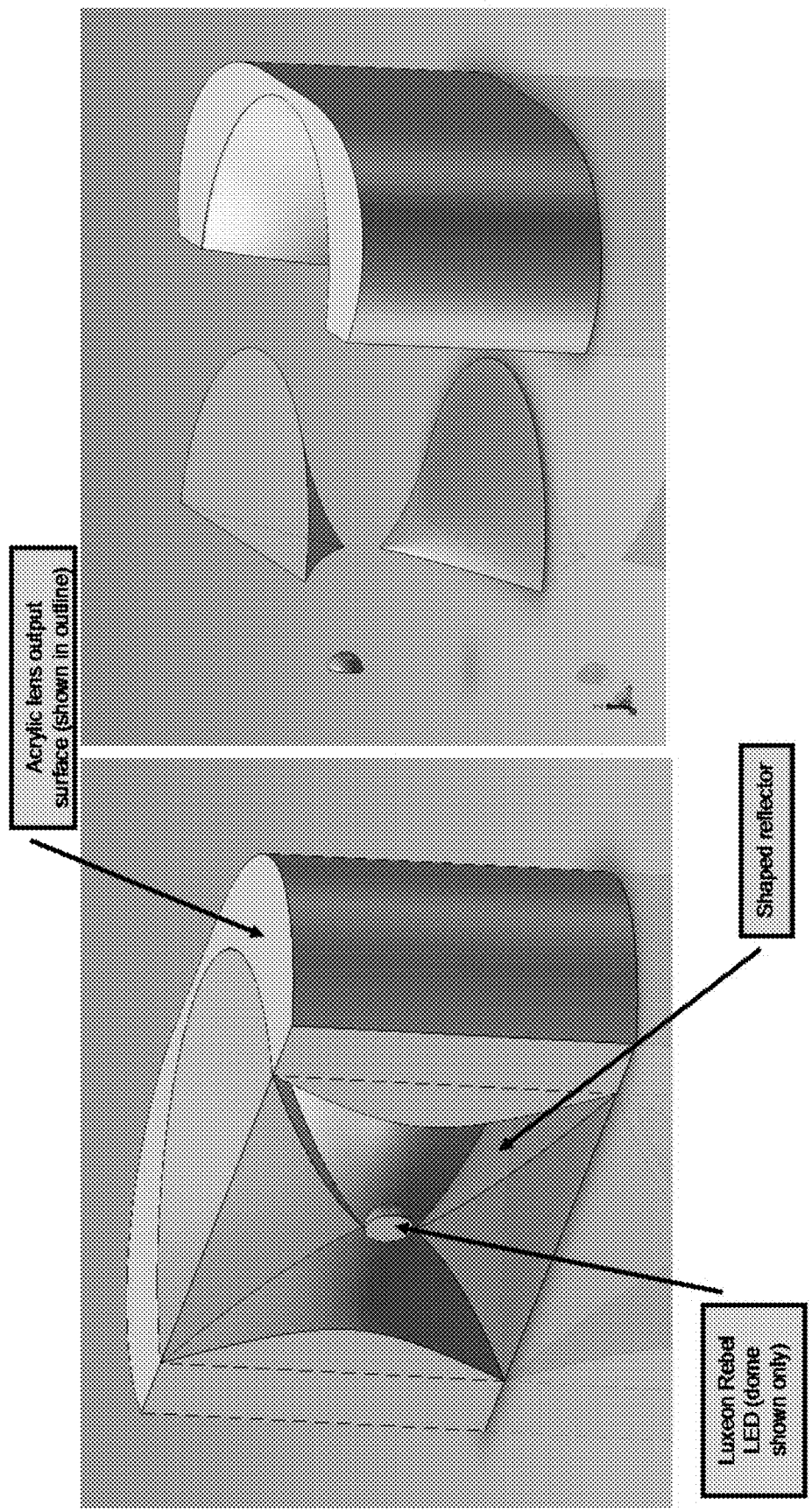
FIG. 6 shows an embodiment with two reflective surfaces.
Figure 7:
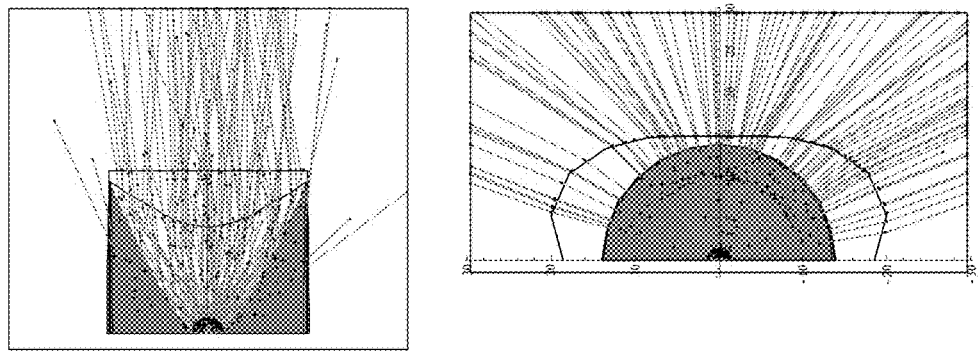
FIG. 7 shows an embodiment configured to output light 140 degrees in the horizontal plane.
Figure 7:
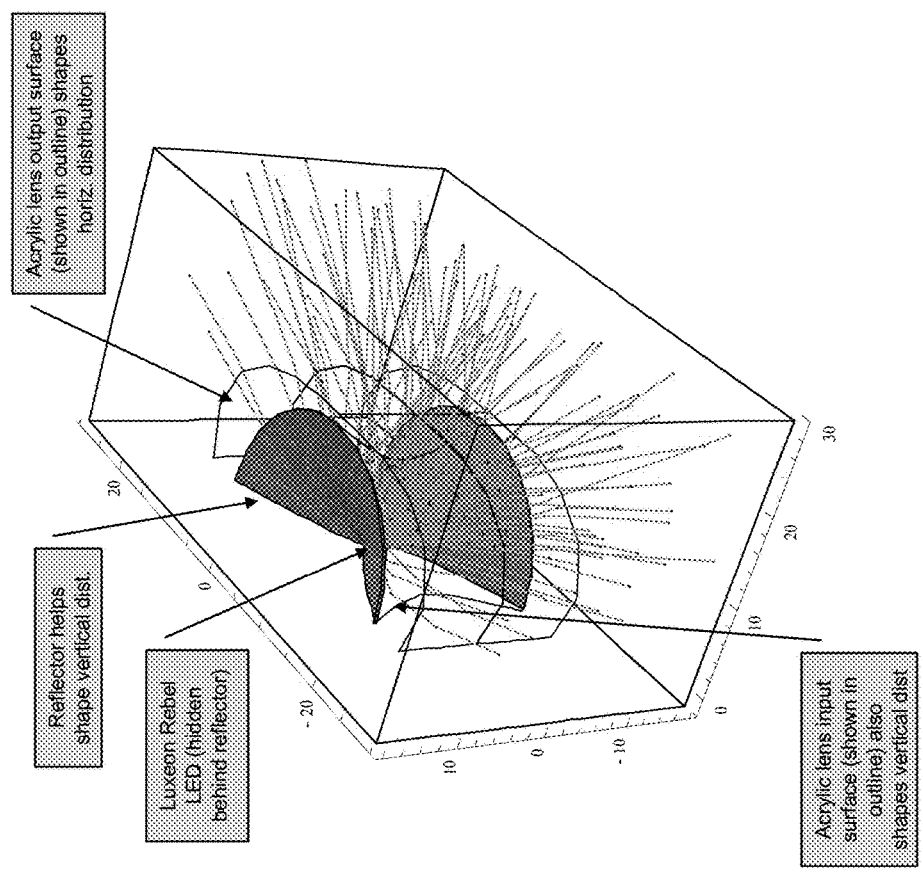
Figure 8:
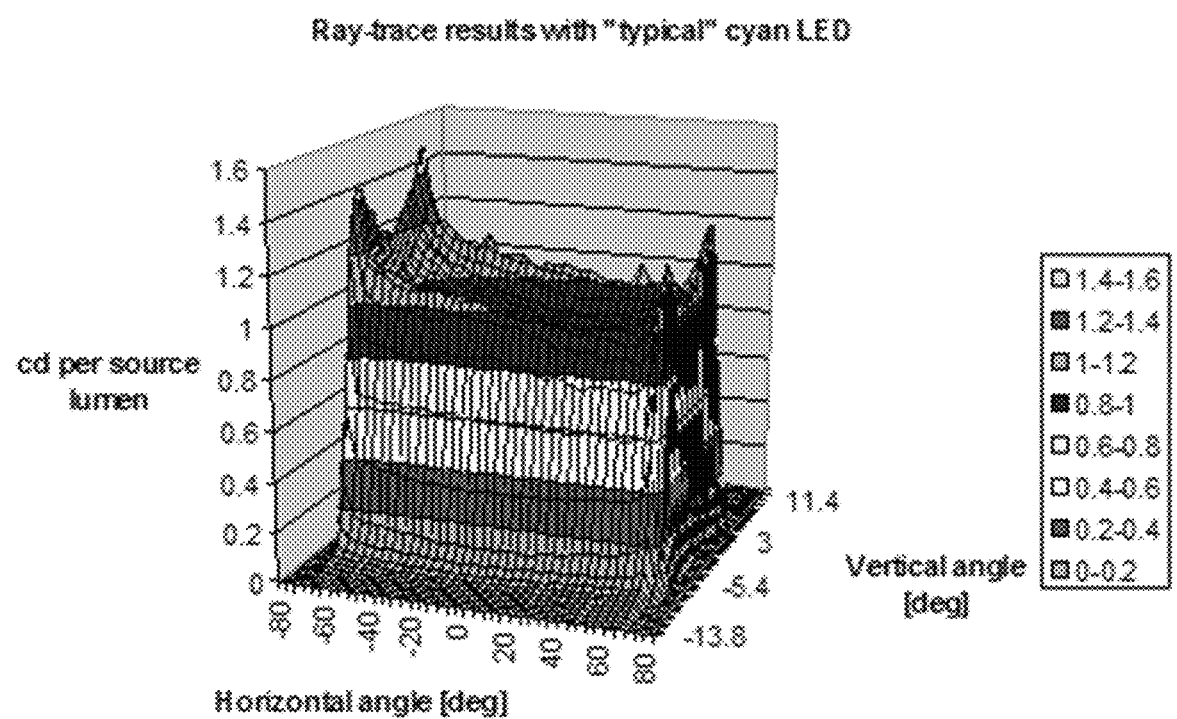
FIG. 8 shows the ray trace results for the embodiment of FIG. 7.
Figure 9:
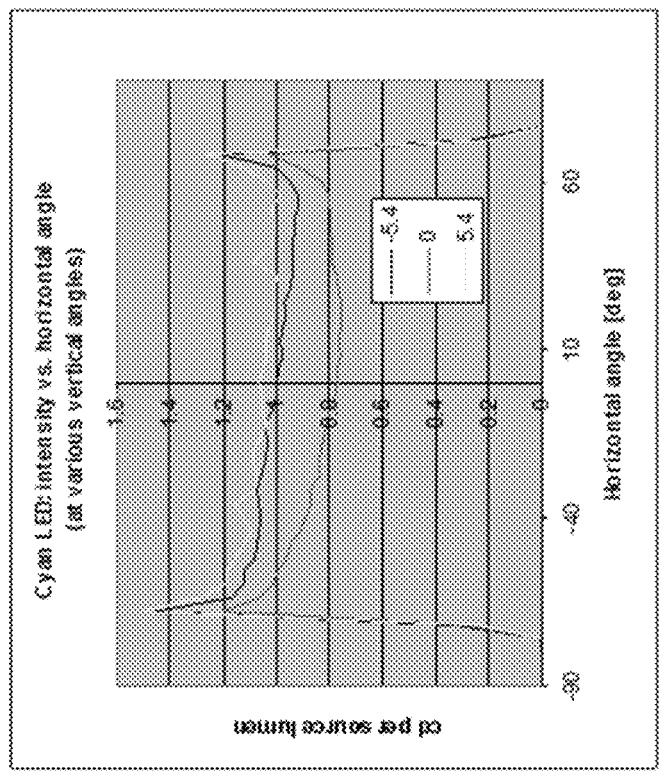
FIG. 9 shows intensity versus horizontal and vertical angle ray trace results for the embodiment of FIG. 7.
Figure 9:
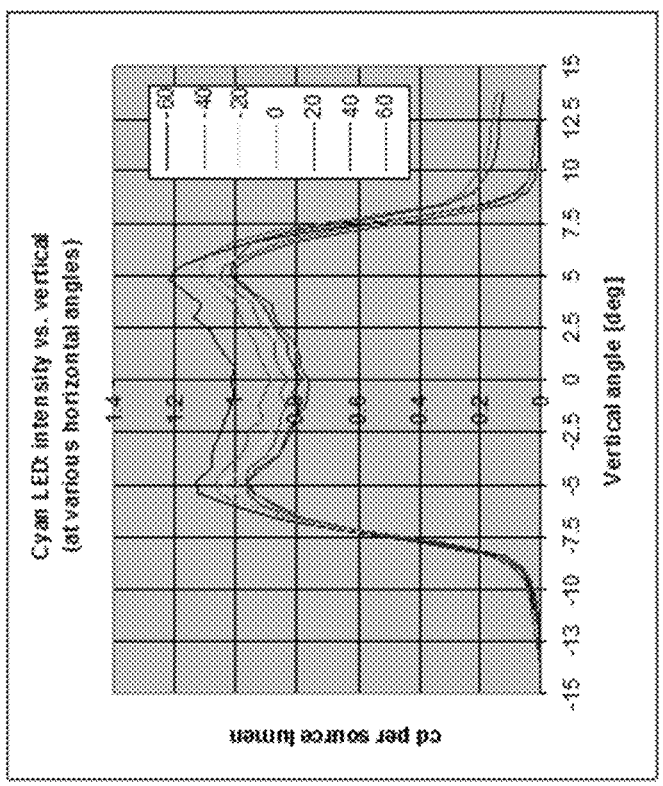

Note that, with the configuration as shown in FIGS. 6 and 7, the embodiment shown has 2 reflective surfaces, one top and one bottom. The reflective surfaces and the inner lens surface serve to at least partially collimate the light rays in the various planes containing the z-axis. The outer lens surface can also be a surface of revolution about the z-axis, in which case the full assembly's distribution in the x-y plane is largely the same as that of the light source alone, but the vertical distribution can be highly collimated. Note, here the z-axis is vertical in the plane of the page.

It can be further advantageous to modify the shape of the outer lens surface so that it is no longer a surface of revolution. In this configuration, a range of distributions in the x-y plane can be produced, different from that of the source. For example, the figures here show an outer surface that produces an approximately constant output vs. horizontal angle when the source itself has a Lambertian intensity distribution. So, for example, one can create a signal lamp with constant output in the horizontal direction using a high-power LED source. One application of such a lamp is an Aircraft Warning Light.

Figure 10:
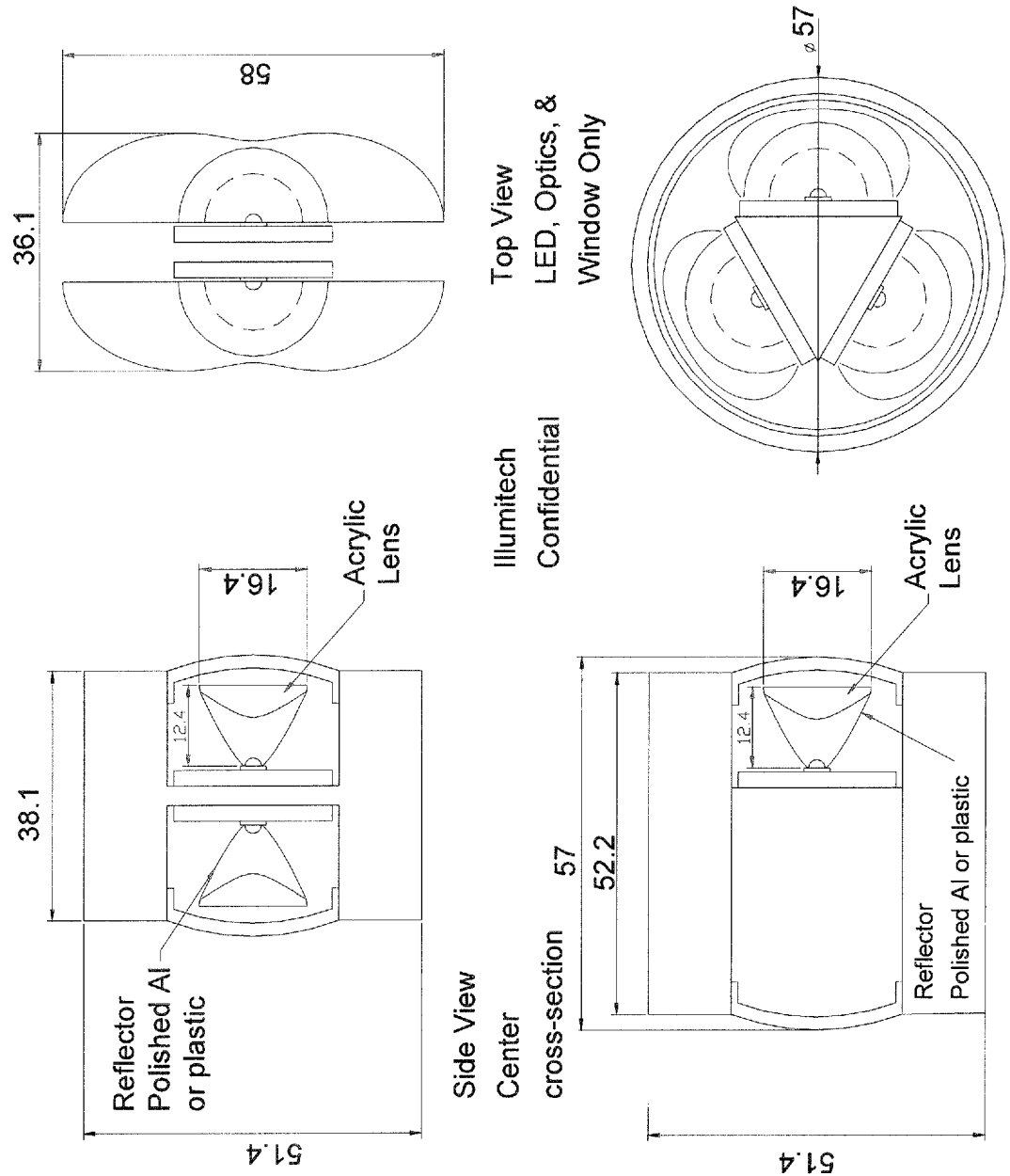
FIG. 10 shows an embodiment with multiple units for varied output angle coverage in the horizontal plane.

In a further implementation, assemblies such shown in FIG. 7 can be combined to provide substantially 360 degree output in the horizontal plane. The top row of the FIG. 10 shows an assembly of two such units each illuminating approximately 180 degrees in the horizontal plane. The bottom row shows an assembly of 3 units, each illuminating approximately 120 degrees. Such an assembly could be used for an emergency signal light or an aircraft warning light.

PureBeam with Output Uniformity-Enhancing or Output-Modifying Features

The output beams of the optics described in our original patent, and in further work below, tend to have sharp edges and color non-uniformities that are undesirable in many applications. In the '446 patent using a diffuser film is described, particularly a holographic diffuser, in front of the outer lens surface to enhance uniformity or modify the output angle. However, such an optical system can be improved upon as discussed in the following paragraphs.

Lens Array Diffusers

Instead of a holographic diffuser, a lens-array diffuser can be used. Such diffusers have an array of approximately close-packed lenses, typically with each unit of the array having a square or hexagonal boundaries when viewed from a position on the optical axis. Each lens can have a spherical cross-section, but more advantageous output distributions can be produced using a non-spherical cross-section. Each lens typically has a diameter less than 1/10 of the array, and at least the wavelength of the light for which the device will be used, to avoid diffraction effects. If the individual lenses are small, it can be advantageous to give them a variable size distribution to avoid diffraction. A pseudorandom distribution is particularly effective in avoiding diffraction.

Asymmetric Output

The features on the diffuser can have variable curvature in different axes, providing an asymmetric output, for example a horizontal stripe, or an elliptical or rectangular distribution.

Integrating the Diffuser with the Lens Surfaces

Similar diffusing features, whether holographic, matte, or lens arrays (spherical or aspheric), can be incorporated in the inner or outer lens surface. For ex., desired surface features can be molded into the lens using injection-molding or injection-compression molding. Diffusion can also be accomplished by adding a diffusing material inside the lens.

Variable Diffusion Across the Lens Surface

When ameliorating color non-uniformities, diffusion at the outer edges of the lens is more effective than in the center of the lens. Therefore it can be advantageous to apply more intense diffusing features in an outer region than in an inner region of the lens. In one implementation of this concept, diffuser features are used over the outer region but no diffuser features at all are used in the inner region. For example, using an 80 mm lens, a central 40 mm portion of the lens has no diffuser features. This implementation can increase brightness and provide a more attractive appearance, relative to a lens with uniform diffusion.

Diffuser Placed Between the Light Source and the Lens

Placing a diffuser between the light source and the inner surface of the lens can enhance uniformity, while providing a more specular outer lens surface. This more specular outer lens surface is considered more attractive in some application. A specular outer surface is also more resistance to contamination by moisture or oils, and easier to clean.

Tailoring the Beam Distributions by Specifying the Lens Output Angle Functions The edge-rays at the lens output surface can be defined in terms of an output angle function $\theta out(y)$ where y is the distance from the optical axis along the lens outer surface. Note, here the y-axis is vertical in the plane of the page. This function can be specified to tailor the output beam distribution. For example, if $\theta out(y)=7$ deg constant, then the output beam will be very sharp-edged, with minimal tails. In another implementation, however, $\theta out$ can be set to vary with y, and thereby add a controlled degree of tails to the output beam. For example, $\theta out(y)=7$ deg$+3$ deg$*(-y-0.3$ diam$)/(0.2$ diam$) y<-0.3$ diam $\theta out(y)=7$ deg$-0.3$ diam$<=y<=0.3$ diam $\theta out(y)=7$ deg$+3$ deg$*(y-0.3$ diam$)/(0.2$ diam$) y>0.3$ diam This will produce a beam with a fairly sharp fall-off at 7 deg, but with tails extending out to 10 deg.

Tailoring the Back Angle Function to Enable a Predetermined Reflector Shape: Example of a Straight-Sided Cone The back angle edge-rays of the lens can be specified in terms $\theta\_back(x,y)$, where x and y are coordinates of the inner lens surface. If a predetermined reflector shape is desired, $\theta\_back$ can be chosen accordingly. For example, in one embodiment the reflector has the shape of a straight-sided cone, which can be easier to fabricate than a curved cone. In a particular embodiment, the straight-sided cone is formed from a polymer film with a reflector coating, where the film is rolled to form the cone.

Figure 11:
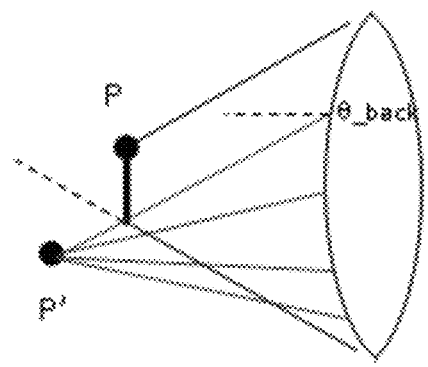
FIG. 11 illustrates one embodiment with a tailored back angle function.

The scheme is shown in FIG. 11. P is the upper edge of the source. The lower arm of the reflector should redirect all edge rays to P. A straight-sided reflector is known to produce an virtual image of the point P, with the virtual image shown here as P'. If all the edge-rays at $\theta\_back(x,y)$ are associated with this image-point P', then a straight-sided reflector will reflect all these edge-rays to P.

Two Lens Stages

Figure 12:
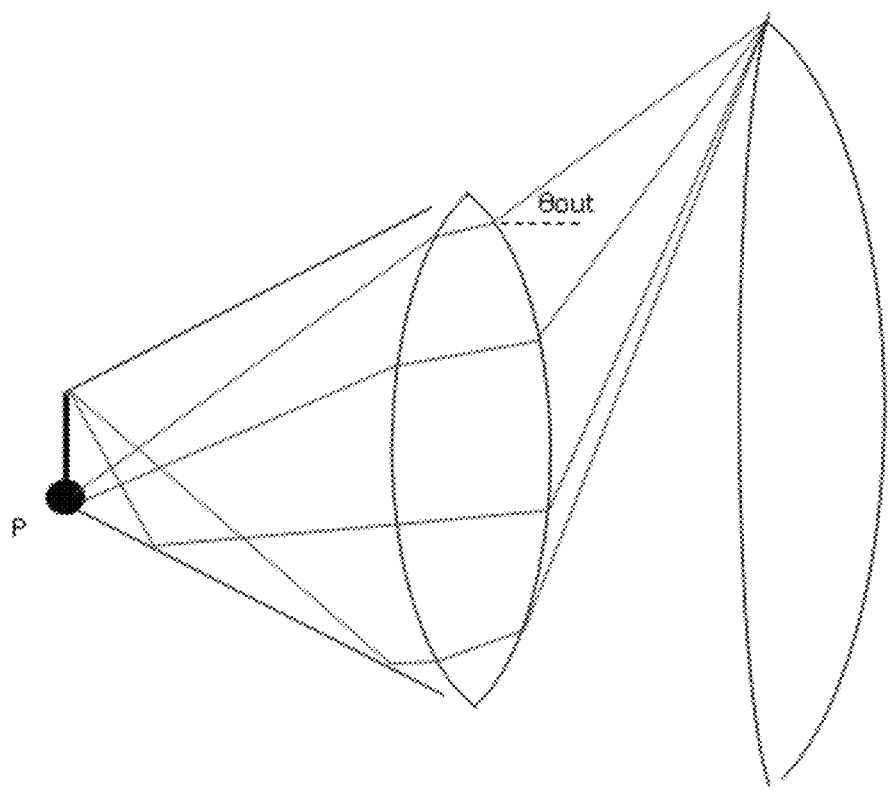
FIG. 12 illustrates one embodiment with two lens stages.

As shown in FIG. 12, lens thickness can be reduced, and other undesirable features such as chromatic aberration and Fresnel losses can be reduced also, by using two lenses. Each lens will be thinner and have less extreme slopes than the single lens that would be needed to serve the same function. $\theta out(y)$ for the first lens should be chosen to maximize the amount of light captured by the second lens, then the design proceeds as normal.

Fresnel Lens

Figure 13:
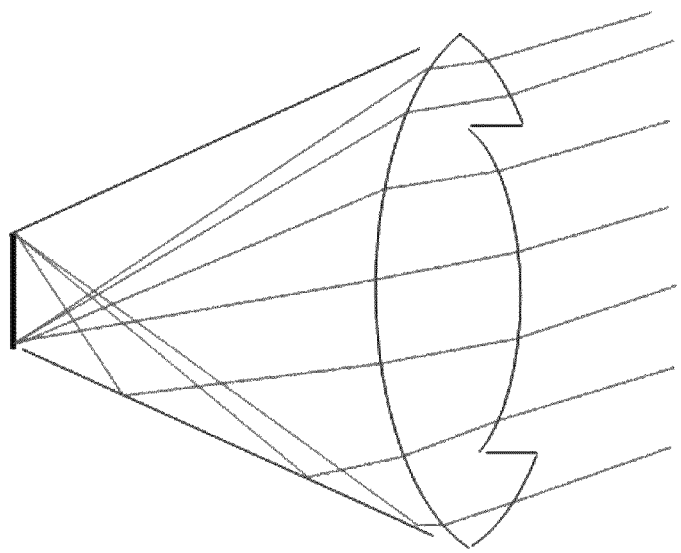
FIG. 13 illustrates an embodiment using a Fresnel lens.

Another embodiment is shown in FIG. 13. Lens thickness can be reduced by breaking the lens into regions of discontinuous slope. The break can be advantageously placed in the central portion of the lens, where thickness can be reduced the most, and where the rays inside the lens are typically most collimated. For designs with collimated output, the break can be further advantageously placed on the outer surface of the lens, because the light just outside the outer surface is more collimated than the light just inside the inner surface, and therefore the sections connecting the lens surfaces on either side of the break will intercept less light.

Each individual section of the lens surface, on either side of the break, is found as before—by requiring that the edge rays (at ° out) be directed substantially to the neighborhood of one edge of the light source, either after refraction through the inner surface of the lens, or after further redirection by the reflector. However, in this case, section of the lens surface is solved for separately, removing the constraint that the whole surface be continuous.

Experimental Data

Figure 14A:
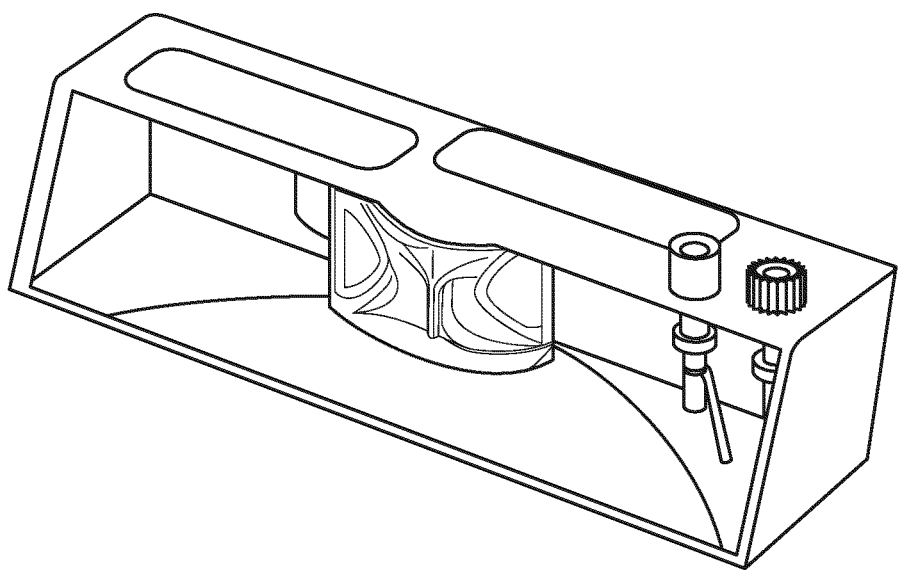
FIG. 14A shows on embodiment utilized for testing.
Figure 14B:
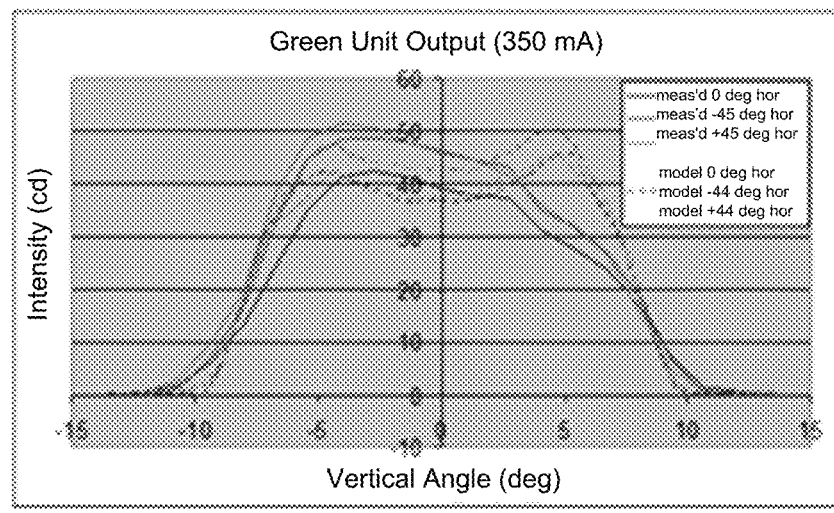
FIG. 14B shows output results.
Figure 14C:
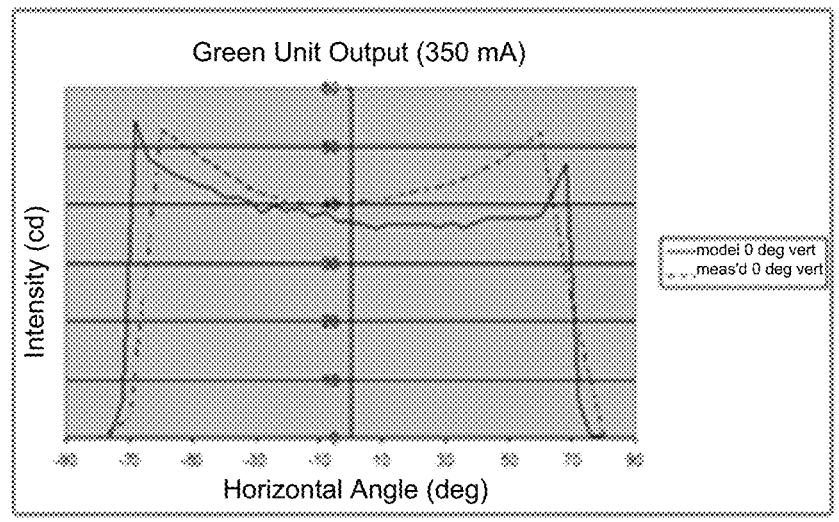
FIG. 14C shows output results.

FIG. 14A shows a photo of the prototype of one embodiment. FIG. 14B-C show measured data showing good correlation with the model predictions.

Figure 15A:
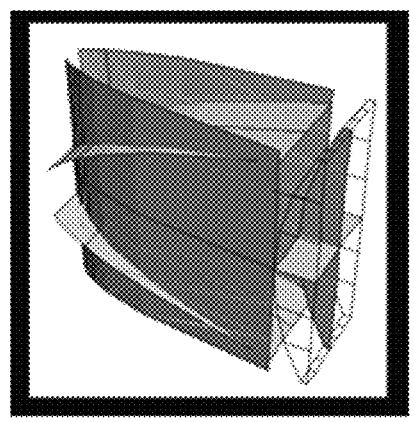
FIG. 15A shows an alternative embodiment for simulated testing.
Figure 15B:
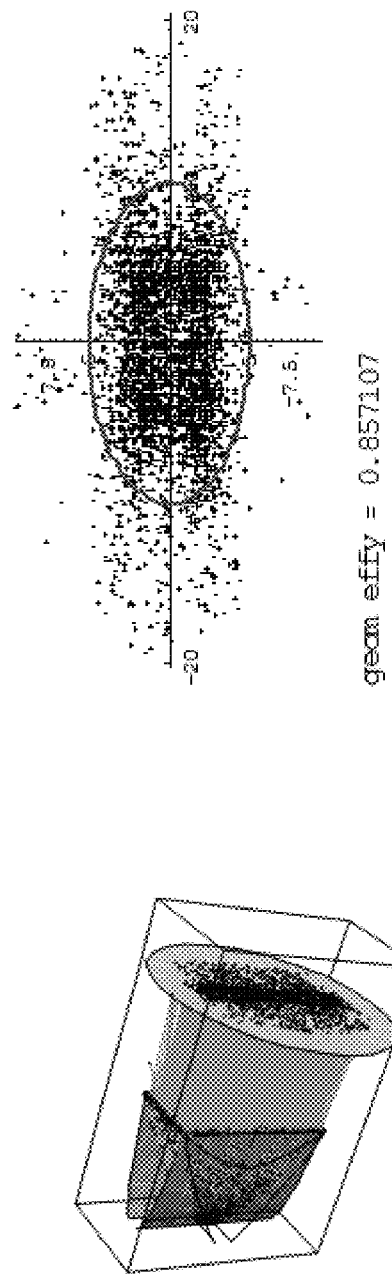
FIG. 15B shows the geometric efficiency and spot diagram angular distribution ray trace results of the embodiment of FIG. 15A.
Figure 15C:
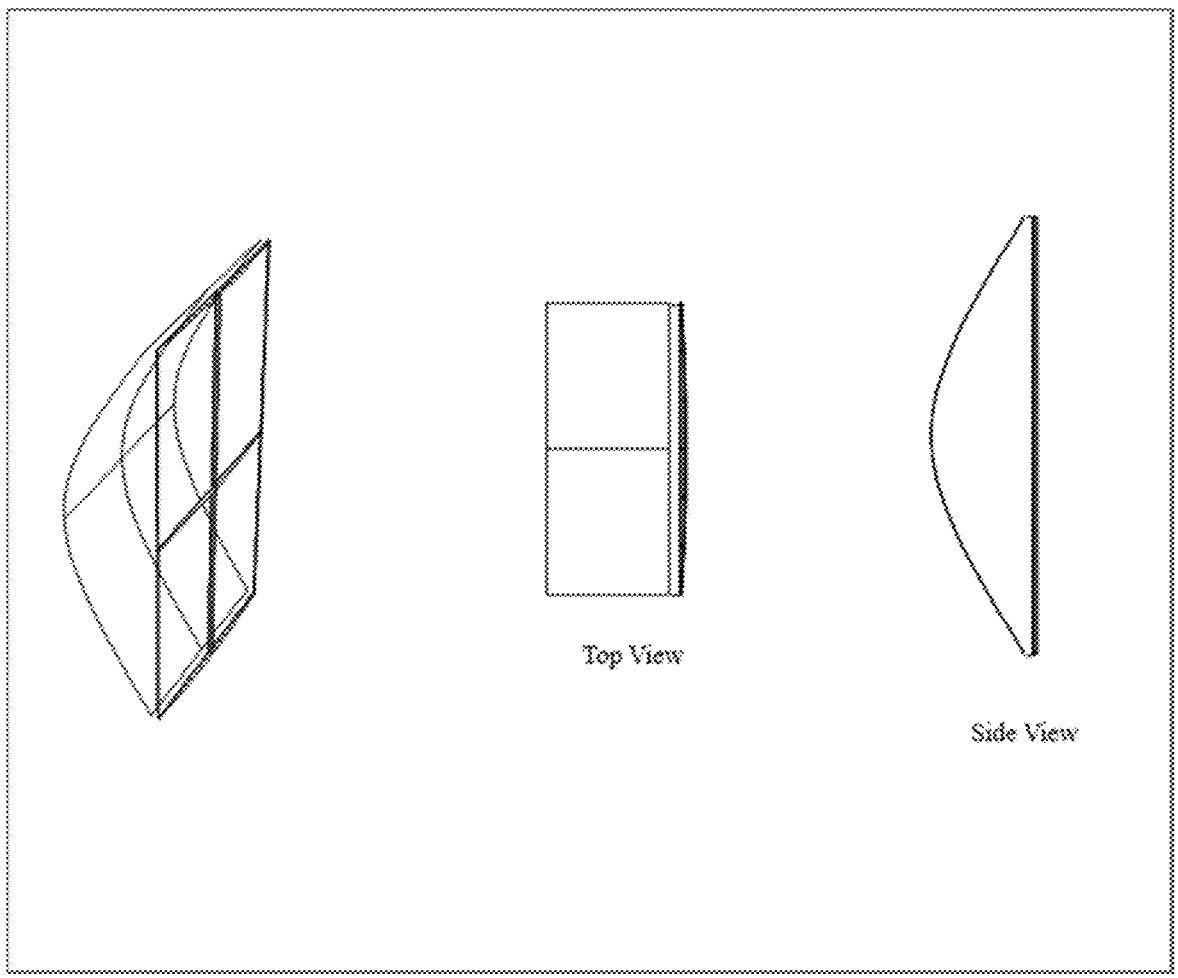
FIG. 15C shows a perspective, top and side view of an embodiment with an orthogonal curvature on opposing faces.

FIG. 15A shows another embodiment that was simulated through raytrace results. FIG. 15B shows geometric efficiency and spot diagram ray trace results. FIG. 15C shows additional views of the tested embodiment. As shown in FIG. 15C, there is a small curvature on the front face which preserves compactness while improving performance in the horizontal, wider-angle (less challenging) axis. One embodiment provides asymmetric results without free-form surfaces that reduces expense and lead-time of prototyping and molding cycles.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A non-imaging optical system for processing a first light distribution having a central first axis, a second light distribution, and at least one ray path connecting said light distributions, the optical system comprising:
   at least two refractive surfaces;
   at least one reflective surface nearer to said first distribution along at least one ray path than the nearest of said two refracting surfaces;
   a second axis passing through said first light distribution and substantially perpendicular to said central axis of said first light distribution;
   said reflective surface and at least a first of said at least two refractive surfaces being substantially rotationally symmetrical around said second axis;
   at least a second of said at least two refractive surfaces being rotationally non-symmetrical around said second axis; and
   said at least one reflective surface and said at least two refractive surfaces cooperating to redirect light edge-rays of said first distribution into light edge-rays of said second light distribution.

2. The system of claim 1, having a horizontal plane parallel to said central first axis and perpendicular to said second axis and a vertical plane parallel to said central first axis and parallel to said second axis, where said second light distribution has a full-width-half-max in said horizontal plane larger than its full-width-half-max in said vertical plane.

3. An optical apparatus comprising at least two of the systems of claim 2, arranged to have their vertical distributions substantially similar to each other and their horizontal distributions substantially offset from each other, the combination of said two devices thus having a combined second distribution whose horizontal full-width-half-max is larger than the horizontal full-width half-max of either device alone.

4. The plurality of devices of claim 2, where said combined horizontal full-width-half-max is greater than 140 degrees.

5. The plurality of devices of claim 2, where said combined horizontal full-width-half-max is greater than or equal to 180 degrees.

6. The plurality of devices of claim 2, where said combined horizontal full-width-half-max approximately 360 degrees.

7. The system of claim 1, further comprising:
   at least three planes substantially parallel to each other and to said first axis;
   wherein said reflective and at least a first of said refractive surfaces have substantially similar cross-sections in said three planes; and further wherein at least one of a second reflective surface and a second of said refractive surfaces having substantially different cross-sections in said three planes.

8. The system of claim 1, wherein the reflective surface and said refractive surfaces cooperation to redirect light edge-rays of said first distribution substantially into the neighborhood of light edge-rays of said second light distribution is with no more than a single reflection from said at least one reflecting surface; and
   at least one additional refractive or reflective surface, said edge-rays of said second light distribution converging in the neighborhood of the edge of said additional refractive or reflective surface.

9. A non-imaging optical system for processing a first light distribution having a central first axis, a second light distribution, and at least one ray path connecting said light distributions, the optical system comprising:

at least two refractive surfaces;
at least one reflective surface nearer to said first distribution along at least one ray path than the nearest of said two refracting surfaces;
said reflective surface and at least a first of said at least two refractive surfaces being substantially rotationally symmetrical around said second axis;
said at least one reflective surface and said at least two refractive surfaces cooperating to redirect light edge-rays of said first distribution into light edge-rays of said second light distribution; and
a horizontal plane parallel to said central first axis and perpendicular to said second axis and a vertical plane parallel to said central first axis and parallel to said second axis, where said second light distribution has a full-width-half-max in said horizontal plane larger than its full-width-half-max in said vertical plane.

10. An optical apparatus comprising at least two of the systems of claim 2, arranged to have their vertical distributions substantially similar to each other and their horizontal distributions substantially offset from each other, the combination of said two devices thus having a combined second distribution whose horizontal full-width-half-max is larger than the horizontal full-width half-max of either device alone.

11. The plurality of devices of claim 10, where said combined horizontal full-width-half-max is greater than 140 degrees.

12. The plurality of devices of claim 10, where said combined horizontal full-width-half-max is greater than or equal to 180 degrees.

13. The plurality of devices of claim 10, where said combined horizontal full-width-half-max approximately 360 degrees.

14. The system of claim 9 further comprising:
at least three planes substantially parallel to each other and to said first axis;
wherein said reflective and at least a first of said refractive surfaces have substantially similar cross-sections in said three planes; and further wherein at least one of a second reflective surface and a second of said refractive surfaces having substantially different cross-sections in said three planes.

15. The system of claim 9, wherein the reflective surface and said refractive surfaces cooperation to redirect light edge-rays of said first distribution substantially into the neighborhood of light edge-rays of said second light distribution is with no more than a single reflection from said at least one reflecting surface; and
at least one additional refractive or reflective surface, said edge-rays of said second light distribution converging in the neighborhood of the edge of said additional refractive or reflective surface.

* * * * *